United States Patent
Van Den Bosch et al.

(10) Patent No.: US 10,588,134 B2
(45) Date of Patent: Mar. 10, 2020

(54) RADIO CHANNEL ALLOCATION FOR WIRELESS INTERFACE USING ULTRA LOW POWER NODES

(71) Applicant: GREENPEAK TECHNOLOGIES N.V., Zele (BE)

(72) Inventors: Bram Van Den Bosch, Berchem (BE); Wilhelmus Van Hoogstraeten, Weesp (NL)

(73) Assignee: Greenpeak Technologies N.V., Zele (BE)

( * ) Notice: Subject to any disclaimer, the term of this patent is extended or adjusted under 35 U.S.C. 154(b) by 39 days.

(21) Appl. No.: 14/905,558

(22) PCT Filed: Jul. 15, 2013

(86) PCT No.: PCT/EP2013/064936
§ 371 (c)(1),
(2) Date: Jan. 15, 2016

(87) PCT Pub. No.: WO2015/007305
PCT Pub. Date: Jan. 22, 2015

(65) Prior Publication Data
US 2016/0157242 A1    Jun. 2, 2016

(51) Int. Cl.
*H04W 72/08*    (2009.01)
*H04W 28/16*    (2009.01)
*H04W 84/18*    (2009.01)

(52) U.S. Cl.
CPC .................... *H04W 72/08* (2013.01)

(58) Field of Classification Search
CPC ............... H04W 72/08; H04W 72/085
See application file for complete search history.

(56) References Cited

U.S. PATENT DOCUMENTS 6,493,331 B1 * 12/2002 Walton ............... H04W 52/24
 370/329
2006/0193299 A1 * 8/2006 Winget ............... H04L 63/0492
 370/338

(Continued)

FOREIGN PATENT DOCUMENTS

CN    1432221 A    7/2003
EP    2547140 A1    1/2013

(Continued)

OTHER PUBLICATIONS

Author Unknown, "ZigBee Specification," ZigBee Alliance, Revision 20, Sep. 19, 2012, 622 pages.

(Continued)

*Primary Examiner* — Brandon M Renner
*Assistant Examiner* — Jay L Vogel
(74) *Attorney, Agent, or Firm* — Withrow & Terranova, P.L.L.C.

(57) ABSTRACT

An ultra low power wireless node (50) sends (100) a packet on at least two radio channels to a network of backbone nodes (65, 70, 75, 80). Which of the radio channels are listened for at the backbone nodes is allocated (130) according to detected reception performance. The allocating is coordinated for different ones of the backbone nodes. By combining sending on multiple radio channels with dynamically allocating the listening channels according to reception performance and with coordinated allocations for different backbone nodes, the spatial diversity and channel diversity of the separate receiving locations can be exploited. This can make the system more resilient to time varying location specific interference or channel specific interference for example.

13 Claims, 12 Drawing Sheets

(56) References Cited

U.S. PATENT DOCUMENTS

| | | | | |
|---|---|---|---|---|
| 2007/0047494 A1* | 3/2007 | Cordone | ............... | H04B 1/1036 370/335 |
| 2007/0205868 A1* | 9/2007 | Tanaka | ................. | G06K 7/0008 340/10.2 |
| 2009/0300161 A1* | 12/2009 | Pruitt | ................. | G06Q 30/0201 709/224 |
| 2010/0098001 A1* | 4/2010 | Yang | ........................ | H04W 4/20 370/329 |
| 2010/0254281 A1* | 10/2010 | Kim | .................... | H04W 72/005 370/252 |
| 2010/0284355 A1* | 11/2010 | Jung | ................... | H04W 52/245 370/329 |
| 2012/0058719 A1* | 3/2012 | Gan | ................... | H04B 7/15535 455/10 |
| 2013/0250845 A1* | 9/2013 | Greene | .................... | H04Q 9/00 370/315 |
| 2014/0064116 A1* | 3/2014 | Linde | .................... | H04W 4/021 370/252 |

FOREIGN PATENT DOCUMENTS

| | | |
|---|---|---|
| EP | 3244510 A1 | 11/2017 |
| WO | 2011055292 A1 | 5/2011 |

OTHER PUBLICATIONS

Doddavenkatappa, Manjunath et al., "Improving Link Quality by Exploiting Channel Diversity in Wireless Sensor Networks," 2011 32nd IEEE Real-Time Systems Symposium (RTSS), Nov. 29, 2011, IEEE, pp. 159-169.

Incel, Özlem Durmaz, "Multi-Channel Wireless Sensor Networks: Protocols, Design and Evaluation," University of Twente, Dissertation, Mar. 20, 2009, 161 pages.

Sha, Mo et al., "Multi-Channel Reliability and Spectrum Usage in Real Homes: Empirical Studies for Home-Area Sensor Networks," 2011 IEEE 19th International Workshop on Quality of Service (IWQoS), Jun. 6, 2011, IEEE, 9 pages.

International Search Report and Written Opinion for PCT/EP2013/064936, dated May 28, 2014, 8 pages.

International Preliminary Report on Patentability for PCT/EP2013/064936, completed Sep. 30, 2015, 11 pages.

First Office Action for Chinese Patent Application No. 201380078892.0, dated Jun. 25, 2018, 27 pages.

Second Office Action for Chinese Patent Application No. 201380078892.0, dated Apr. 24, 2019, 17 pages.

Examination Report for European Patent Application No. 13737240.5, dated Jul. 17, 2019, 7 pages.

\* cited by examiner

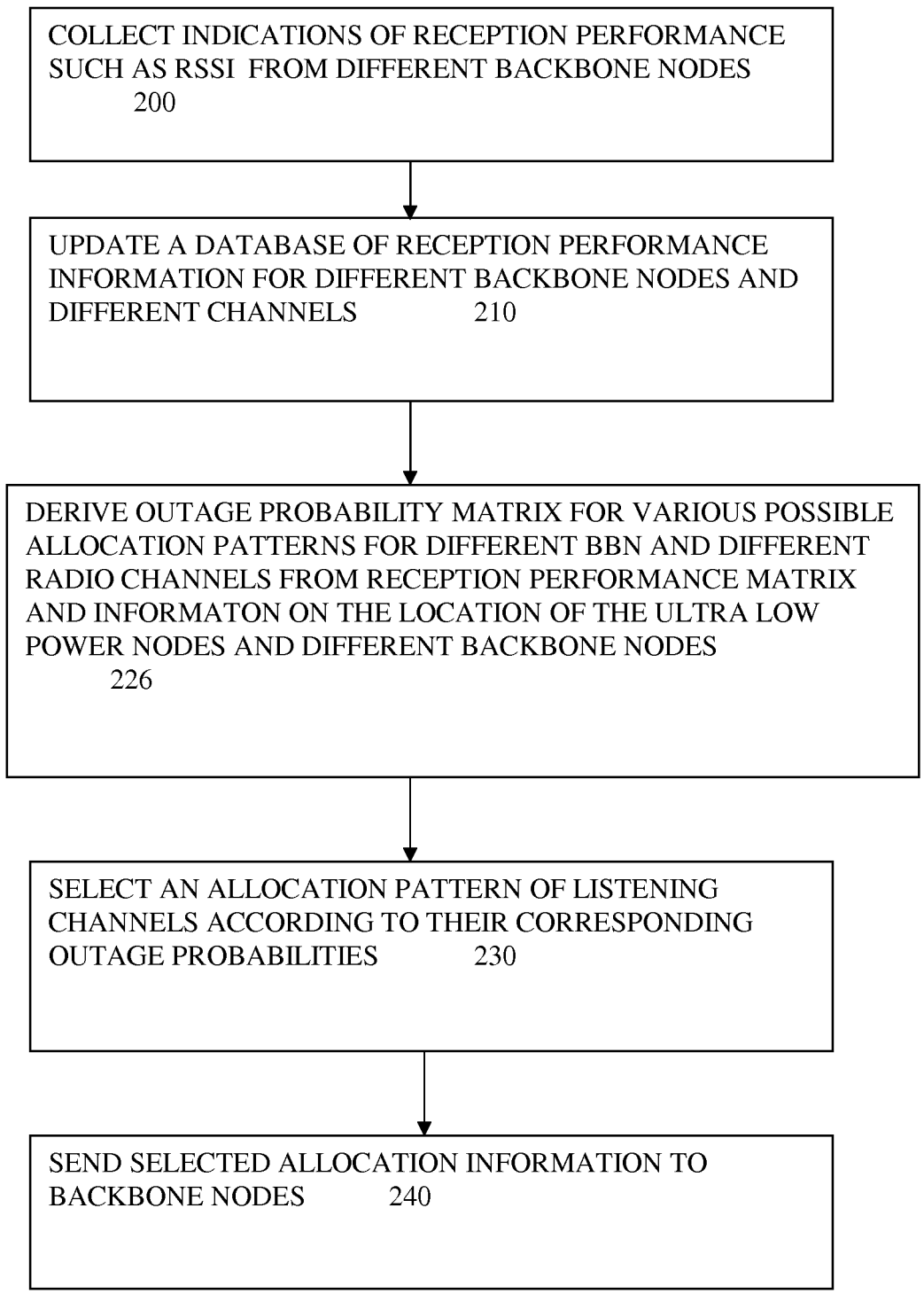

RADIO CHANNEL ALLOCATION FOR WIRELESS INTERFACE USING ULTRA LOW POWER NODES

CROSS-REFERENCE TO RELATED APPLICATION

This application is a U.S. national phase of International Application No. PCT/EP2013/064936, filed Jul. 15, 2013, the disclosure of which is hereby incorporated by reference in its entirety.

TECHNICAL FIELD

The present invention relates to methods of operating a wireless interface, to methods of allocating listening radio channels for such an interface, to corresponding apparatus, to networks having such an interface, and to corresponding computer programs.

BACKGROUND

Wireless networks based on a standard like IEEE 802.15.4 (/ZigBee), IEEE 802.11 (/Wi-Fi) or IEEE 802.15.1 (/Bluetooth) are commonly known. These operate in the 2400-2483.5 MHz ISM band (Industrial, Scientific and Medical) band. They are relatively low power short range systems (10-100 m) and can be interfered by other radios that are nearby and can cause high interference levels on nearby frequencies. This can be a constraint on attempts to reduce power consumption in wireless interfaces.

ZigBee for example is a low data rate (250 kbit/s) system with security features and enables a mesh network to be created ad hoc, to enable any device to reach more distant devices. In 2012 the ZigBee PRO Green Power feature was announced which allows ultra low power devices such as battery-less devices to securely join ZigBee PRO networks through a wireless interface which is designed to minimise the amount of power used. It is a more eco-friendly way to power ZigBee products such as sensors, switches, dimmers and many other devices. These devices can now be powered just by harvesting widely available, but often unused sources of small amounts of energy such as motion, light, vibration.

Devices can use energy harvesting to overcome the disadvantages of being mains powered or battery powered. Mains powering a device results in an installation cost, and it can only be used for non-mobile devices. The batteries of battery powered devices have a limited lifetime and the economic and environmental cost of regularly replacing batteries is not always acceptable.

Ultra Low Power (ULP) wireless nodes are characterized by the fact that they require zero-maintenance (no battery replacements), without the need to be mains powered. This can be achieved in principle in several ways. A first possibility is by making the battery lifetime larger than an expected or designed product lifetime by reducing the power consumption, such that the batteries last longer than the expected lifetime of the product. In this case the product lifetime has an upper bound set by the self-depletion of the battery.

A second possibility either instead of or together with first possibility is to use energy harvesting techniques. By reducing the power consumption, such that the required power/energy levels can be harvested from the environment. Energy harvesting is commonly regarded as deriving energy from external sources (e.g., solar power, thermal energy, wind energy, salinity gradients, and kinetic energy), and using or storing it for small, wireless autonomous devices, like those used in wearable electronics and wireless sensor networks. ZigBee Green Power [2] is an extension to the ZigBee PRO networking stack [1] that allows incorporating ultra low power nodes—with a focus on energy harvested nodes—in a ZigBee PRO network. ZigBee Green Power enables ultra low power devices to use a wireless interface to complete a communication to a backbone network using typically hundreds of microJoules of energy. There are three type of nodes involved:

GreenPower Device

The GreenPower Devices (GPD) are a type of ultra low power wireless nodes. They typically generate the commands that should have an effect on the sink nodes (GPS) in the backbone network such as a ZigBee PRO network. One example is an energy harvesting switch (being a GPD) that generates a Toggle command, to toggle the state of a lamp (being a GPS) on the ZigBee PRO network. Because of these restrictions in energy, GPDs can only transmit the packets a limited number of times: typically they broadcast packets 3 times on a single channel. This channel is predefined, is configured using switches on the device itself, or can be negotiated during an initial commissioning procedure. In its simplest form the GPD can only transmit packets, and cannot receive any packet.

GreenPower Proxy

The GreenPower Proxies (GPP) are the nodes on the backbone network (ZigBee PRO network for example) that are mains powered and, when they are within radio range of the GPD, pick up the packets broadcast by the GPD, and deliver them to the sink nodes (GPS) over the ZigBee PRO backbone network. Since the GPD broadcasts its messages, these can be received by multiple GPPs, creating a form of redundancy in the network. The GPPs can fulfill an application level role at the same time.

Mains Powered GreenPower Sink

The GreenPower Sinks (GPS) are the nodes on the ZigBee PRO network that are mains powered and can have an application level entity which can be controlled by the GPD. For example, a lamp that is toggled by the energy harvesting switch at the GPD. The GPS does not need to be in radio range of the GPD, but has to be connected over the ZigBee PRO network with one or more proxy nodes (GPP) within radio range of the GPD. GPS nodes can often also act as GPP nodes directly.

SUMMARY OF THE INVENTION

An object is to provide improved methods, devices, networks and programs. An aspect of the invention provides a method of operating a wireless interface for communicating between an ultra low power wireless node and a network of backbone nodes, by making transmissions from the ultra low power wireless node to send the same packet on at least two radio channels, receiving the transmissions carrying the packet at the backbone nodes, and detecting reception performance of the wireless interface. There is also a step of dynamically allocating which of the radio channels are listened for at the backbone nodes according to an indication of the detected reception performance, wherein the allocating comprises making coordinated allocations for different ones of the backbone nodes.

By combining sending on multiple radio channels with dynamically allocating the listening channels according to reception performance and with coordinated allocations for different backbone nodes, the spatial diversity and channel diversity of the separate receiving locations can be exploited. This can make the system more resilient to time varying location specific interference or channel specific interference for example. This means the probability of reception outage can be reduced compared to channel allocations made independently for each backbone node without coordination. This is particularly useful where there is little or no adaptability in the transmitting side. The benefits can apply for various different types of coordination, for example whether the detections are collected from different backbone nodes and the allocations are determined together from the collected information, or whether candidate allocations are made separately from local detections. In the latter case the coordinating can involve comparing the candidate allocations and adjusting them to form a desired pattern of allocations. See FIGS. 3, 4 and 5 for example.

Embodiments can have additional features added, or such features can be disclaimed to define claims, and some of such additional features are described in more detail and set out in dependent claims. One such additional feature is the step of making the transmissions from the ultra low powered wireless node being made without dynamic radio channel selection based on radio channel selection feedback information from the backbone nodes. By avoiding dynamic selection of radio channel, the ULP node can avoid consequences such as added power consumption, add costs and add complexity at the ultra low power wireless node. See FIGS. 3 and 6 for example.

Another aspect provides a method of allocating listening radio channels for a wireless interface for communicating between an ultra low power wireless node and a network of backbone nodes, for use when the ultra low power wireless nodes send transmissions having the same packet on at least two radio channels, for receiving at the backbone node, having the steps of receiving an indication of reception performance of the wireless interface, and allocating dynamically which of the radio channels are listened for at the backbone nodes according to the indication of reception performance, wherein the allocating comprises making coordinated allocations for different ones of the backbone nodes, and outputting the allocations to the backbone nodes. This corresponds to the first aspect but encompasses the allocating part for the first aspect. See FIGS. 4, 7 and 9 for example.

An additional feature is the indication of reception performance of the wireless interface comprising at least one of: an indication of reception performance of the transmissions detected by the backbone nodes, and an indication of wireless interference detected otherwise. This can enable further refinement of allocations to suit different conditions and different types of interference. See FIG. 6, 8 or 10 for example.

Another such additional feature is the indication of reception performance of the transmissions comprising at least one of: an indication of whether the packet was received by the backbone nodes, an RSSI associated with the packets received by the backbone nodes, and any other link quality indication of the packets received by the backbone nodes, and wherein the indication of wireless interference detected otherwise comprises at least one of: an RSSI level of the interference measured, the carrier sense assessments of interference measured, correlation of the interference over multiple channels, correlation of interference over multiple backbone nodes and interference detected at the ultra low power wireless node and sent to the backbone nodes. These are accessible, relatively convenient to measure, and commonly supported by available hardware, though others can be envisaged. See FIGS. 6, and 8 for example.

Another such additional feature is the step of allocating comprising passing the detections of reception performance by at least two of the backbone nodes to a common location and making the allocations based on the detections collected at that common location. By collecting the detections, a desired pattern of allocations can be made conveniently from the same basis. This may be more efficient than alternatives such as making candidate allocations from local detections then coordinating by collecting and adjusting the candidate allocations rather than sharing the detections. See FIGS. 8 to 11 for example.

Another such additional feature is determining outage probabilities for each radio channel for each of the backbone nodes for different patterns of listening channel allocations according to the detections and carrying out the allocating based on the determined outage probabilities. This is a convenient way to enable different patterns of allocations to be assessed. See FIGS. 9 to 11 for example.

Another such additional feature is the allocating being biased to be more dependent on more recent ones of the indications of reception performance. This can help make the adapting more responsive to rapid changes in reception conditions. See FIG. 10 for example.

Another such additional feature is the transmissions comprising transmissions from at least two ULP wireless nodes, and the allocating step comprises making allocations for listening channels of the backbone nodes from the set of transmit channelsused by the at least two ULP wireless nodes. This can provide more reception performance information and lead to better coordinated allocation. See FIG. 11 for example.

Another such additional feature is the step of determining outage probabilities for each of the ULP wireless nodes for each of the backbone nodes for each of the radio channels for each of the channel allocation patterns. This can help enable the allocation to be optimised for multiple ULP wireless nodes which may have different outage probabilities even for the same radio channels. See FIG. 11 for example.

Another such additional feature is the step of making the allocations is also dependent on locations of the ULP wireless nodes and the backbone nodes where detections of reception performance are made. This can further improve the allocations by enabling better correlation of detections to determine whether detected interference is location specific for example, or to interpolate between detections at different locations. See FIG. 12 for example.

Another aspect provides apparatus for allocating listening radio channels of a wireless interface for communicating between an ultra low power wireless node and a network of backbone nodes, for use when the ultra low power wireless nodes are arranged to send transmissions having the same packet on at least two radio channels, for receiving at the backbone nodes, the apparatus having an input for receiving an indication of reception performance of the wireless interface. There is also a processor configured to allocate dynamically which of the radio channels are listened for at the backbone nodes according to the detections of reception performance, wherein the allocating comprises making coordinated allocations for different ones of the backbone nodes, and outputting the allocations to the backbone nodes. This corresponds to the above allocating methods. See FIGS. 3 and 7 for example.

An additional feature is the processor also being configured to determine outage probabilities for each radio channel for each of the backbone nodes for different patterns of listening channel allocations according to the indications and to carry out the allocating based on the determined outage probabilities. See FIGS. 7 to 12 for example.

Another aspect provides a network having the apparatus set out above and having backbone nodes coupled to the apparatus, the backbone nodes being configured to detect the reception performance and to send the indications of the reception performance to the apparatus. See FIG. 3 for example.

Another aspect provides a computer program for allocating listening radio channels for a wireless interface for communicating between an ultra low power wireless node and backbone nodes, for use when the ultra low power wireless nodes send transmissions having the same packet on at least two radio channels, for receiving at the backbone nodes, the program having instructions for causing a processor to carry out the method set out above. See FIG. 7 for example.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIG. 12 shows another embodiment showing allocation based on correlation based on locations of detections.

DETAILED DESCRIPTION

Figure 1:
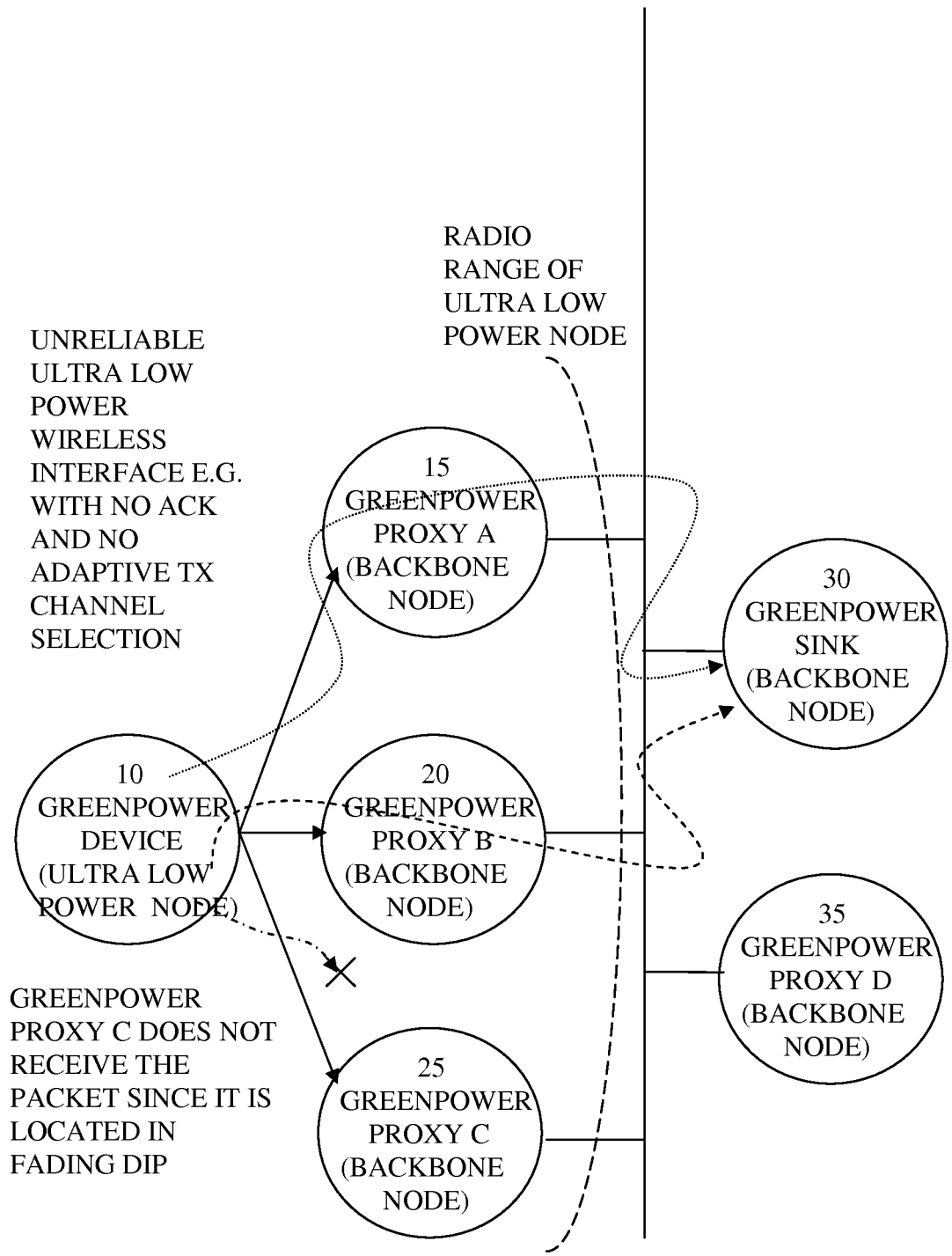
FIGS. 1 and 2 show schematic views of networks according to conventional prior art techniques.

The present invention will be described with respect to particular embodiments and with reference to certain drawings but the invention is not limited thereto but only by the claims. The drawings described are only schematic and are non-limiting. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

Elements or parts of the described nodes or processors may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to programs or software can encompass any type of programs in any language executable directly or indirectly by a processor.

References to logic, hardware, processor or circuitry can encompass any kind of logic or analog circuitry, integrated to any degree, and not limited to general purpose processors, digital signal processors, ASICs, FPGAs, discrete components or transistor logic gates and so on.

References to ultra low power nodes are intended to encompass wireless nodes having protocols designed for a lower power consumption by their wireless parts than the power used by the backbone nodes they are to communicate with. In particular examples the lower power consumption can be lower than a conventional ZigBee node. In more particular examples the nodes are designed to be self powering without maintenance for their design lifetime. In particular they may have an energy harvesting power source and/or a battery power source, designed so that they never need a replacement battery. In particular examples the power consumption can be less than 10 milliJoules per packet transmission, or less than 1 milliJoule per packet transmission.

References to backbone nodes are intended to encompass nodes of any kind of network, not limited to the ZigBee nodes of the examples described.

ABBREVIATIONS

BER bit error rate
BBN(s) Backbone node(s)
GPD Green Power Device
GPP Green Power Proxy node
GPS Green Power Sink node
LQI link quality indicator
PER packet error rate
RSSI received signal strength Indicator
SIR signal-to-interference ratio
SNR signal-to-noise ratio
TX Transmitter
ULP Ultra Low Power
ULPNs Ultra Low Power node(s)

REFERENCED DOCUMENTS

[1] ZigBee Specification, ZigBee Alliance, Revision 20, Sep. 19, 2012
[2] ZigBee Green Power Specification, ZigBee Alliance, Revision 23, Version 1.0, Aug. 22, 2012
[3] Multi-Channel Wireless Sensor Networks: Protocols, Design and Evaluation, Ozlem Durmaz Incel, University of Twente, The Netherlands IEEE 802.15.4 is the basis for networking stacks like ZigBee RF4CE, ZigBee PRO and ZigBee IP, as well as other standards and proprietary stacks.

Figure 2:
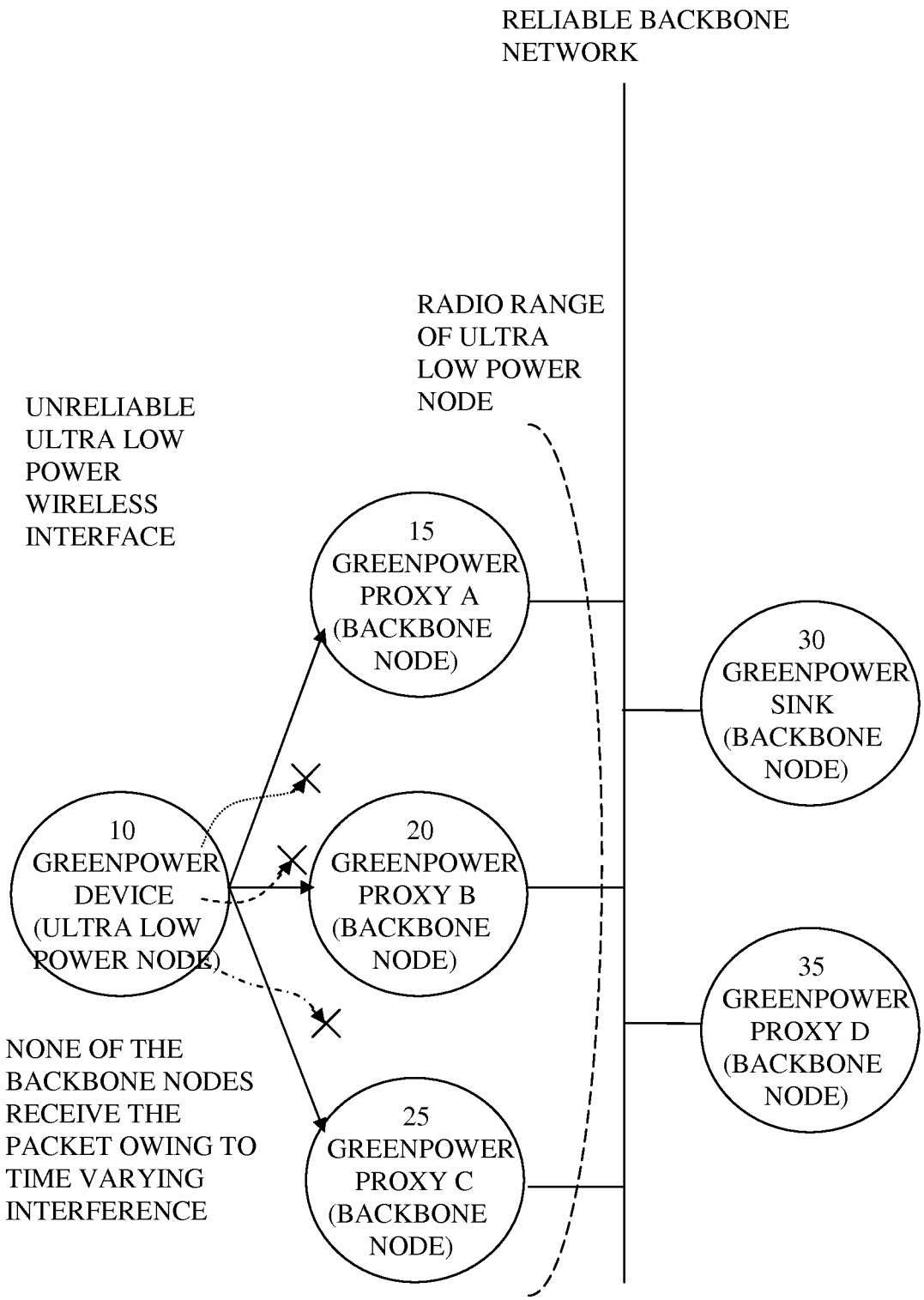

FIGS. 1, 2, Introduction to Some Issues with Conventional Wireless Interfaces for ULP Nodes.

FIG. 1 shows a typical scenario according to conventional practice. A reliable backbone network is provided such as a ZigBee PRO network using acknowledged transmissions and extensive number of retries, both on a hop-by-hop and end-to-end level. This has a number of Green Power proxy nodes A, B, C, D 15, 20, 25, and 35 and a Green Power sink backbone node 30. These are coupled by reliable wireless links. A Green Power device GDP (or ULP) node 10 tries to communicate with the sink node 30 via an unreliable ultra low power wireless interface, having no acknowledgement and no adaptive transmission channel selection.

The GPD broadcasts the packet multiple times on the same radio channel. There are three GPPs (A, B, C) within the radio range of the GPD. Two of the GPPs (A, B) pick up the packet at least once. The third GPP (C) fails to receive any of the broadcasted packets (since it is located in a fading dip). The first two GPPs will deliver the packet to the desired destination (sink node) over the reliable backbone network formed by the ZigBee PRO network. In this case, the second packet transmission is redundant, since even when only one of A or B had received the packet and delivered it to C, the system would have operated correctly.

As described in [1], when a ZigBee PRO coordinator starts a new network, it will scan all channels to find out what channels are already in use by other (ZigBee PRO) networks in the neighborhood and it will avoid setting up its own network on one of these channels. As described in [3], when the bandwidth offered by a single channel is not sufficient, the network can use multiple channels to increase the available bandwidth and associated throughput. The GreenPower Devices always send their packets on a single channel.

FIG. 2 shows a similar schematic view of the same network, but in the situation that the reception conditions for the unreliable ultra low power wireless network are worse. As shown in FIG. 2, the single radio channel is compromised, and none of the packets is received by any of the backbone nodes, and the communication fails. Hence if this channel is compromised due to interference, the reliability of the communication can be hampered. Since the transmissions are broadcasted and as such unacknowledged, the GreenPower Devices do not notice the interference, and cannot take counter measures such as retransmitting, delaying, or changing the transmission channel.

Introduction to Some Features of Embodiments:

Instead of transmitting the same packet a number of times on a single channel, in embodiments described below, the GreenPower Device (ULP node) transmits the same packet on a number of different channels. This can extend the redundancy in the network to the channel domain. This redundancy can be exploited by having the listening channels of the GreenPower proxies (receiving Backbone nodes) spatially distributed in a uniform way, to optimize the chance of receiving the packet of the GreenPower device (ULP node) in case a channel gets compromised due to interference.

By allocating the listening channels of the backbone nodes dynamically according to reception performance, rather than according to a static predetermined pattern, the wireless interface can be made more resilient to actual conditions.

In the following description, Ultra Low Power nodes, which are not on the backbone network, are called ULP nodes and may be referenced by capital letters, e.g. Node A, Node B.

Nodes on the backbone network are called Backbone nodes and may be referenced by numbers, e.g. Backbone Node 1, Backbone Node 2.

Figure 3:
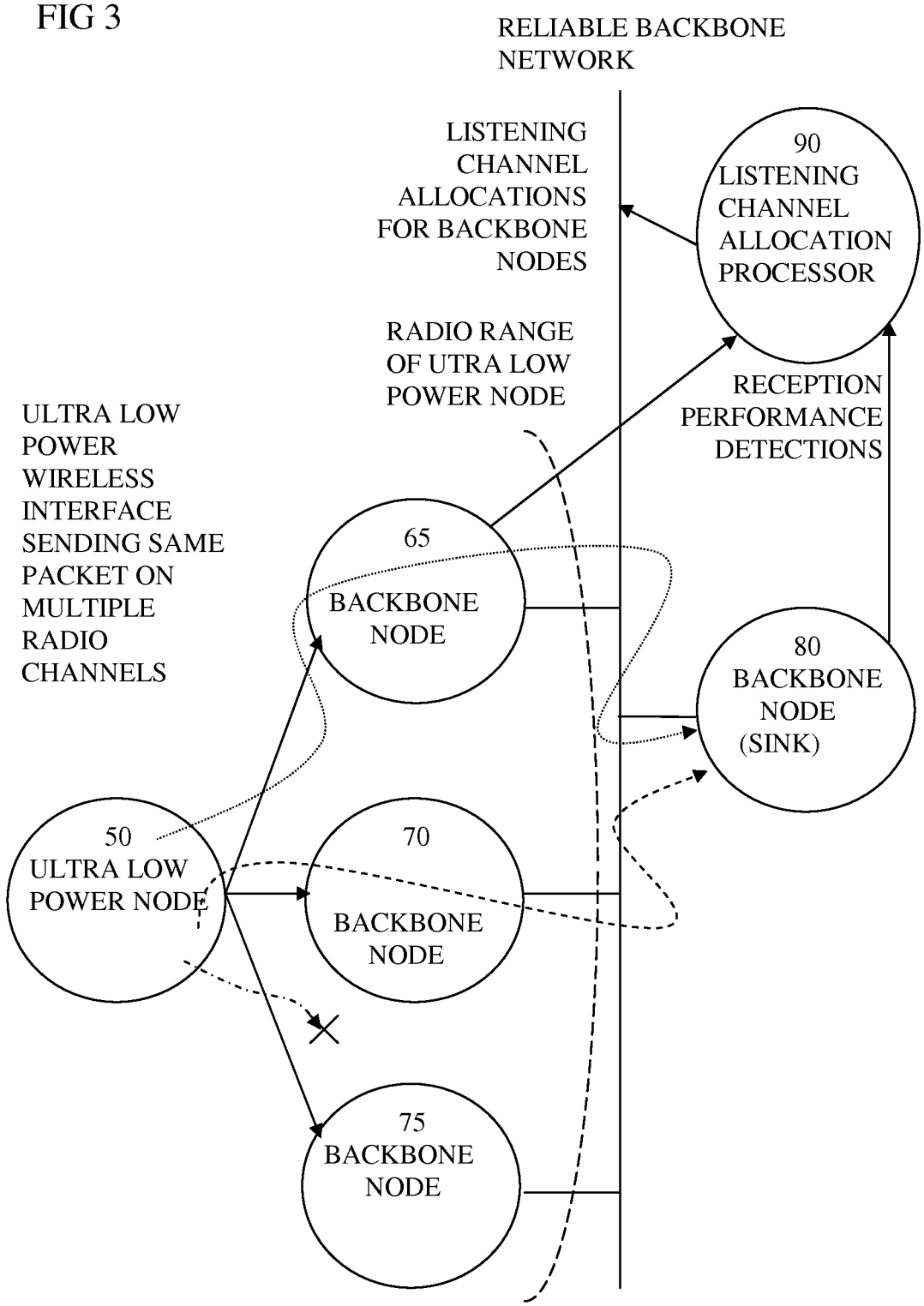
FIG. 3 shows a schematic view of a network according to an embodiment.

Packets are referenced by Greek letters, derived from the ULP node by which they are transmitted, and have a subscript indicating the order of transmission of the packet:

$a_i$ is the i-th packet transmitted by ULP Node A $\beta_k$ is the k-th packet transmitted by ULP Node B FIG. 3, Network View According to an Embodiment FIG. 3 shows a schematic view of a network according to an embodiment. In this case the backbone network is shown with three receiving nodes 65, 70 and 75 within range of a ULP node 50. Backbone node 80 is a sink for the communication from the ULP node. The ULP node has at least a radio transmitter capable of transmitting on at least two radio channels. The set of Backbone nodes are connected with each other over a wireless or wired backbone network, and at least some of these Backbone nodes are equipped with at least a radio receiver capable of receiving packets on the same radio channels used by the ULP node for transmitting. A listening channel allocation processor 90 is provided for allocating listening channels to the different backbone nodes which can receive from the ULP node via the ultra low power wireless network.

The ULP node broadcasts its packets on at least two radio channels, so a packet $a_i$ broadcasted by ULP Node A, is received by a subset of the Backbone nodes. For each of the Backbone nodes and for each of the radio channels ULP Node A is capable of transmitting on, the allocation processor dynamically (regularly or triggered by the reception by the backbone network of a packet transmitted by the ULP node) determines channel allocations by estimating the reception performance of the ultra low power wireless interface. This can be based on for example packet error rates for a future packet $a_{i+n}$ with n>0, based on for example the information of whether the packet $a_i$ was or was not received by the respective Backbone nodes, and the channel, signal strength and link quality associated with the eventual reception.

Combining the estimated packet error rates on a network scale level, the allocation processor can dynamically allocate the listening channel of the Backbone nodes, in order to maximize the probability that a future packet $a_{i+n}$ is received by at least one of the Backbone nodes, in case of interference on one or more of the radio channels ULP Node A is broadcasting. The allocation processor can be located anywhere and can be centralized or distributed. One option is to have it co located or integrated with the sink node, or incorporated as a function of any node when it acts as a sink node. This is convenient as the sink node receives the packets from the receiving backbone nodes and thus can easily receive detections of reception performance from these receiving backbone nodes.

Notably this allocation feature contrasts with a conventional ZigBee Green Power node which transmits on only one predetermined channel, so listening channels are pre determined and there was no adaptation of the listening channels, so no need for a dynamically adaptable listening pattern. It also contrasts with a cellular network which can receive at multiple base stations but does not allocate listening channels because base stations listen on all channels and feedback info to a mobile device for it to select a radio channel to transmit on, so again there is no dynamically adaptable pattern of listening channels coordinated for different backbone nodes.

In some examples the ULP node has no wireless receiver capability, in others it has a limited very low power receiver which is only used sparingly, such as for commissioning, not during typical communications operations.

Figure 4:
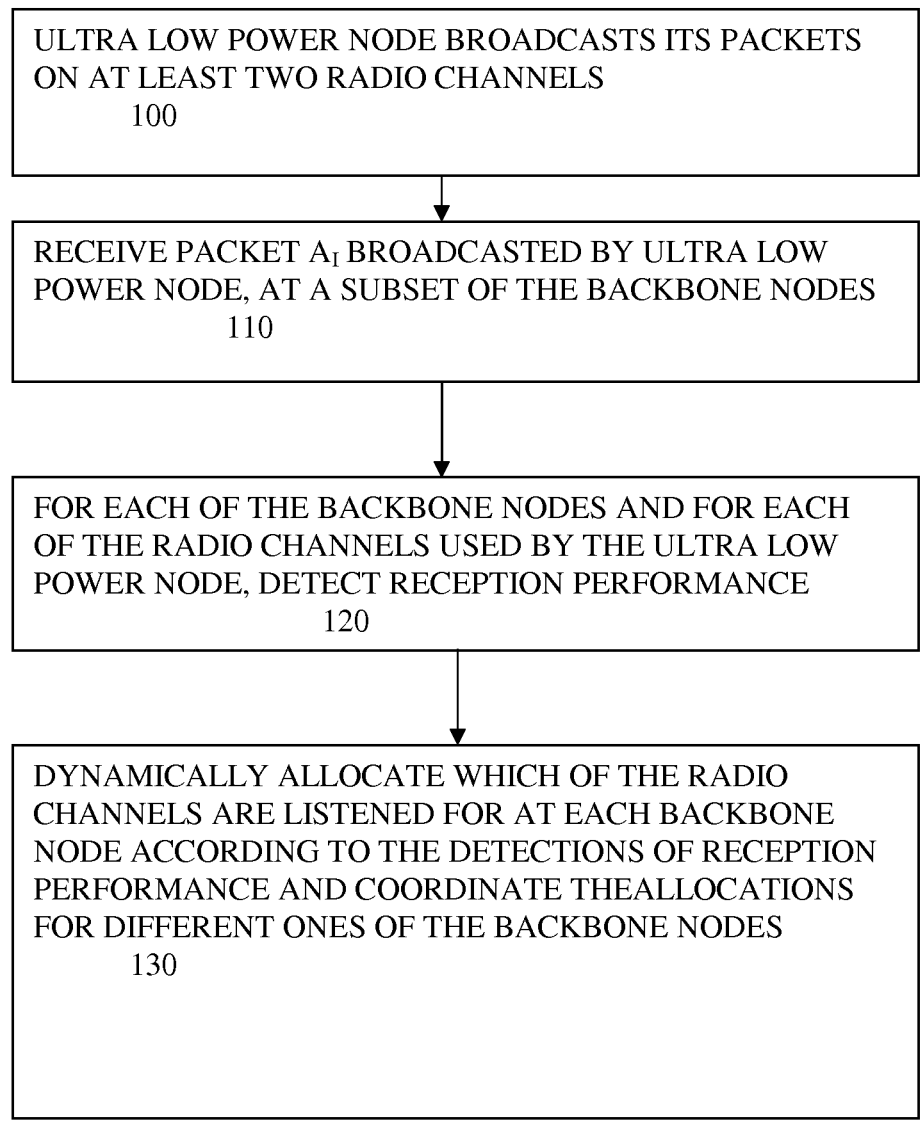
FIG. 4 shows steps of a method of operating according to an embodiment.
Figure 5:
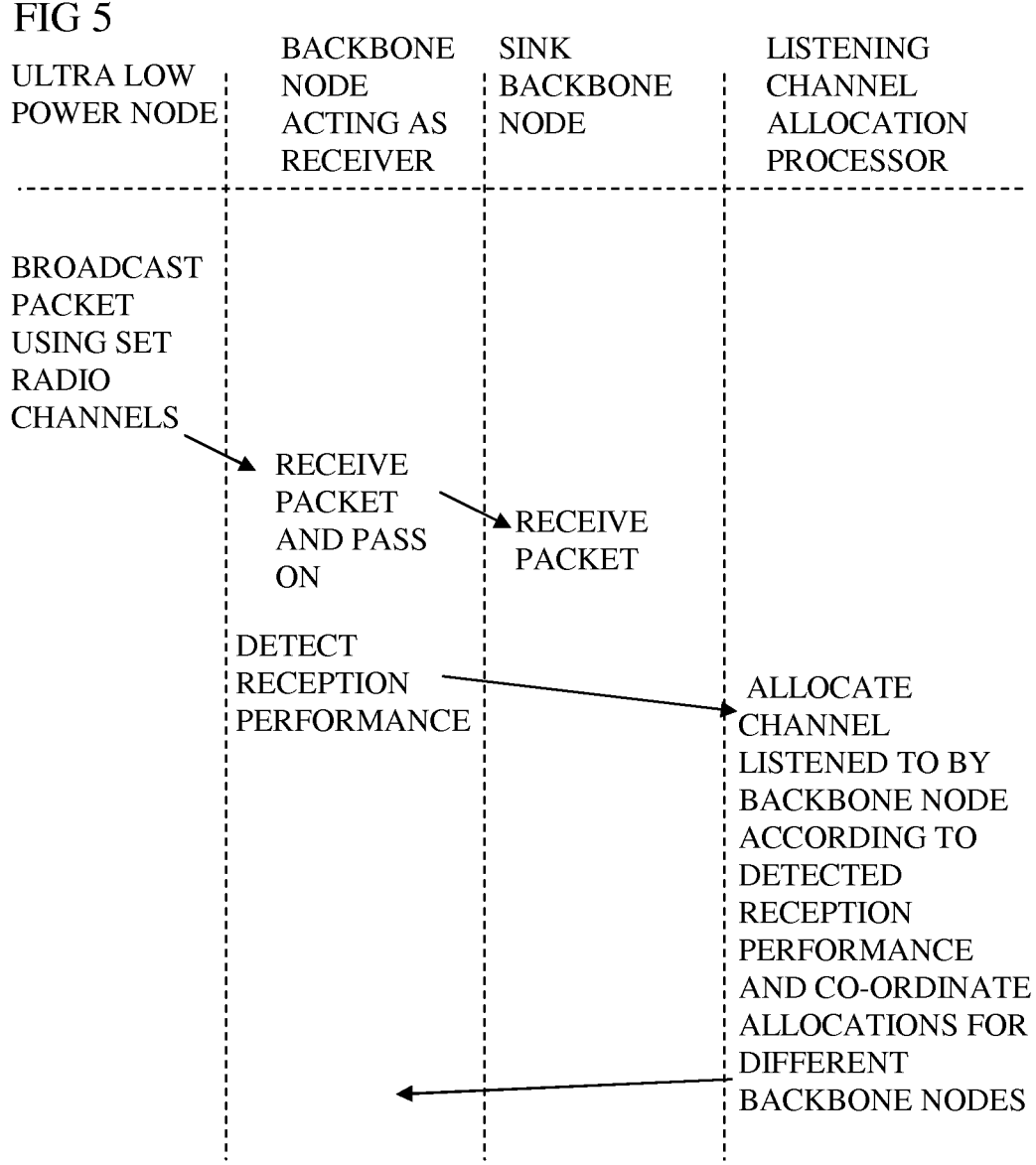
FIG. 5 shows a time chart of a sequence of steps according to an embodiment.
Figure 6:
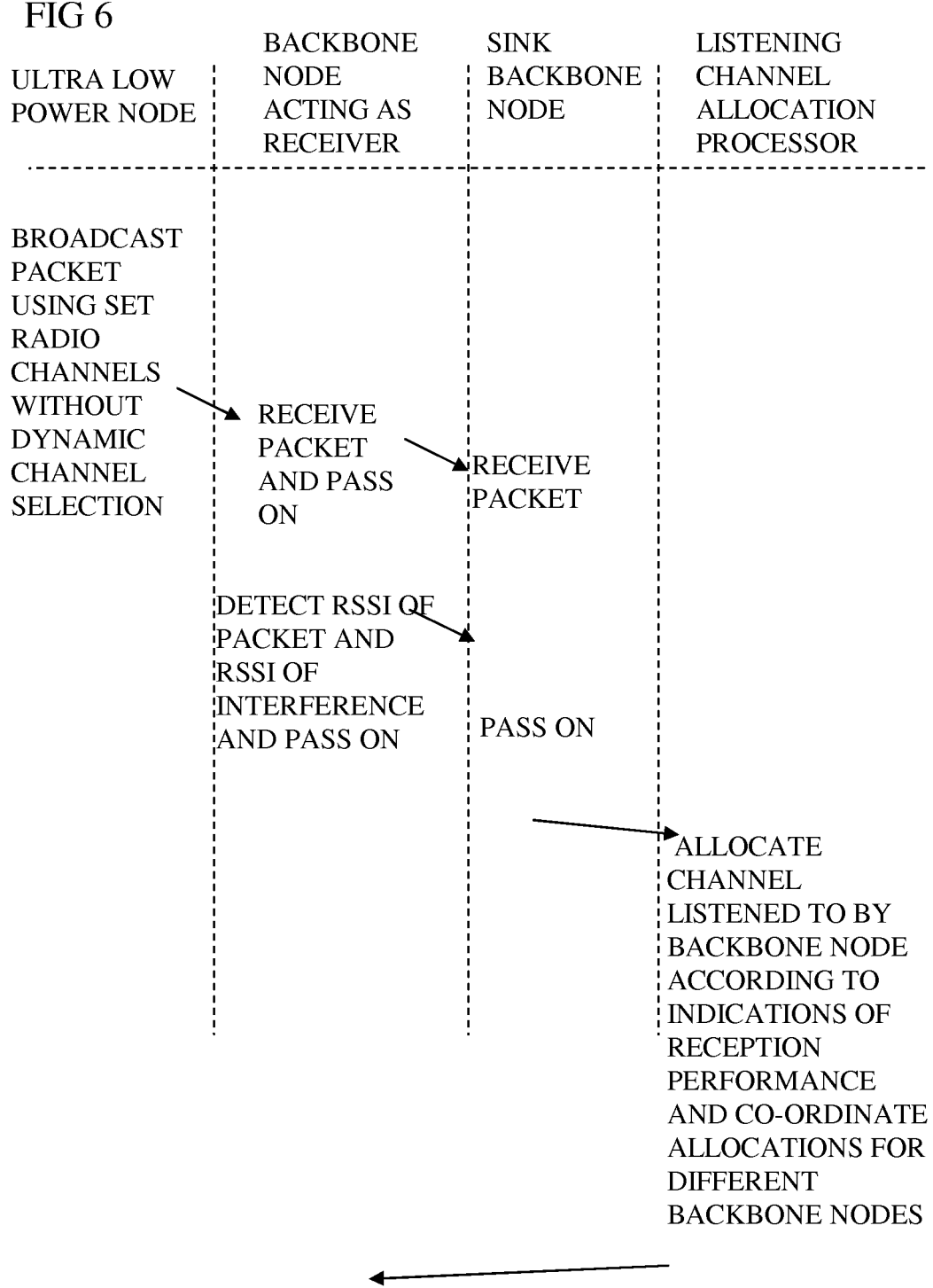
FIG. 6 shows a time chart of a sequence of steps according to an embodiment.

FIGS. 4, 5 6 Flow Chart and Time Charts According to Embodiments

FIG. 4 shows steps carried out in operating the ultra low power wireless interface according to an embodiment. At step 100, the ULP node broadcasts its packets on at least two radio channels. At step 110, nodes of the backbone receive packet $a_i$ broadcasted by ULP node. At step 120, for each of the backbone nodes and for each of the radio channels used by the ULP node, reception performance of the ultra low power wireless interface is detected. Which of the radio channels are listened for at each backbone node is allocated at step 130 according to the detections of reception performance and the listening channel allocations are coordinated for different ones of the backbone nodes.

FIG. 5 shows a time chart for corresponding steps, with time flowing down the figure. A left hand column shows actions at the ULP node. A next column shows actions at a receiving backbone node. A next column shows actions at a backbone node acting as a sink, and the right hand column shows actions of the listening channel allocation processor. As in FIG. 4, the ULP node broadcasts the same packet using a set of two or more radio channels. Backbone nodes acting as receivers receive the packet and pass it on towards the sink node. The sink backbone node receives the packet and has application level software and hardware for using the packet. The backbone nodes may also detect reception performance and pass this on to the listening channel allocation processor. This allocation processor allocates the channel to be listened to by backbone nodes according to the detected reception performance and coordinates the allocations for different backbone nodes.

In some embodiments the allocation can use the information from multiple packets transmitted by the same ULP node. A series of packets $a_i, a_{i+1}, \ldots, a_{i+k}$ broadcast by ULP Node A are received by a subset of the Backbone nodes. For each of the Backbone nodes and for each of the radio channels ULP Node A is capable of transmitting on, dynamically (regularly or triggered by the reception by the backbone network of a packet transmitted by the ULP node) the allocation processor estimates the packet error rates for a future packet $a_{i+n}$ with n>k, based on whether each of the packets in the series of packets $a_i, a_{i+1}, \ldots, a_{i+k}$ was or was not received by the respective Backbone nodes, and the channel, signal strength and link quality associated with the eventual receptions.

Combining the estimated packet error rates on a network scale level, the allocation processor can dynamically allocate the listening channels of the Backbone nodes, in order to maximize the probability that a future packet $a_{i+n}$ is received by at least one of the Backbone nodes, in case of interference on one or more of the radio channels ULP Node A is broadcasting.

FIG. 6 shows a similar time chart to that of FIG. 5. In this case, the ULP node broadcasts without dynamic channel selection based on any feedback of interference levels. The reception performance detections can include detecting RSSI associated with the packet, and RSSI associated with other packets on the same or other radio channels, an RSSI level of interference measured, and carrier sense assessments of interference measured. The allocation processor can also determine and use correlations of the interference over multiple channels, and correlations of interference over multiple backbone nodes. In some cases accurate timing information of the interference detected at the different locations can be compared to enable correlation of the interference detections in time over multiple backbone nodes. This can be used as another factor when making the coordinated allocations of the channels of the different backbone nodes.

Figure 7:
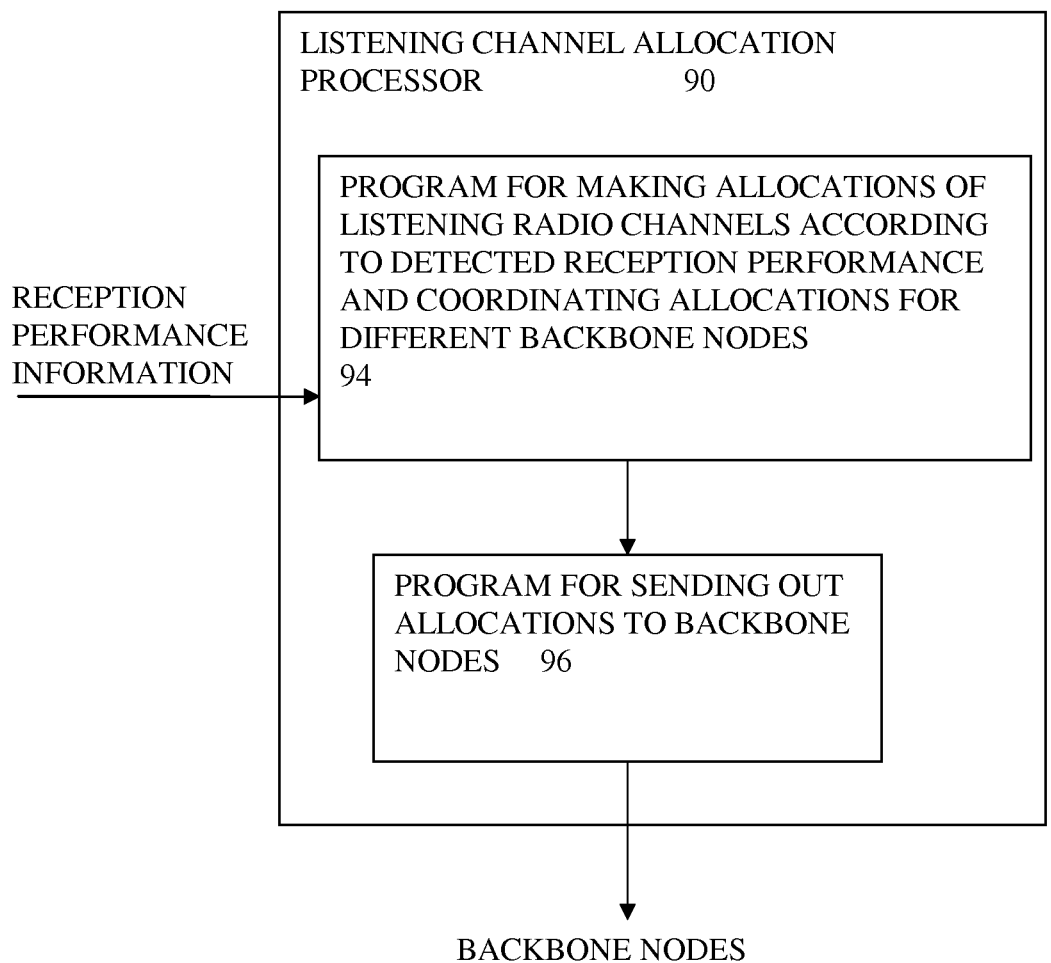
FIG. 7 shows a schematic view of an allocation processor according to an embodiment.

FIG. 7, Listening Channel Allocation Processor

FIG. 7 shows a schematic view of an example of a listening channel allocation processor 90. It has a program 94 for making allocations according to detected reception performance information received from backbone nodes or elsewhere, and for coordinating allocations for different backbone nodes. This program passes outputs to a program 96 for sending out allocations to respective backbone nodes. The programs can be executed by any kind of general purpose processor or more specific circuitry following established practice, and can be divided up into modules as desired.

Figure 8:
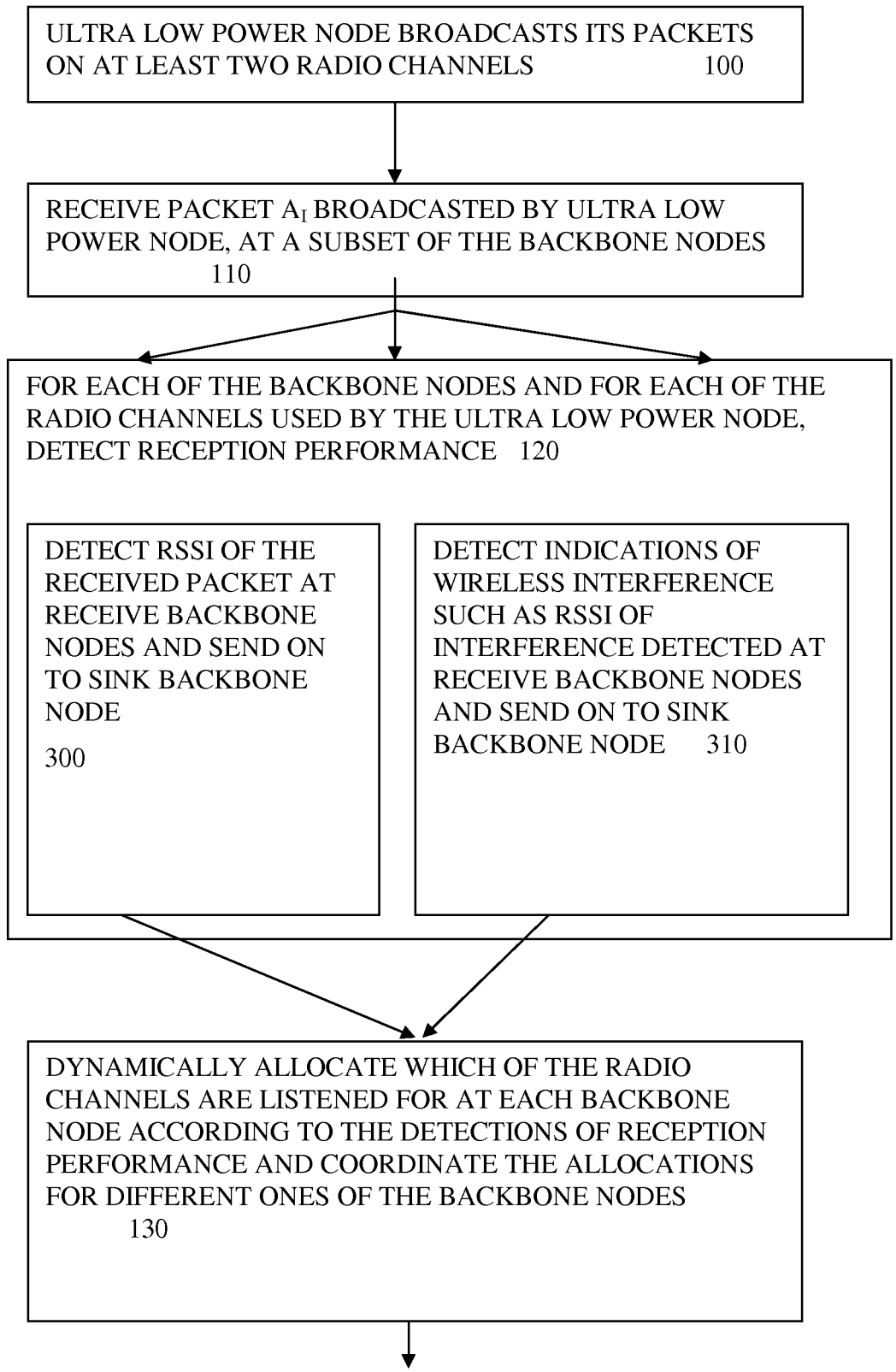
FIG. 8 shows steps of a method of operating according to an embodiment showing various ways of detecting reception performance.

FIG. 8 Method Showing Various Reception Performance Measures

FIG. 8 shows steps of a method of operating according to an embodiment similar to that of FIG. 4 and showing various ways of detecting reception performance. As in FIG. 4, at step 100, the ULP node broadcasts its packets on at least two radio channels. At step 110, nodes of the backbone receive packet $a_i$ broadcasted by ULP node. At step 120, for each of the backbone nodes and for each of the radio channels used by the ULP node, reception performance of the ultra low power wireless interface is detected. Which of the radio channels are listened for at each Backbone node is allocated at step 130 according to the detections of reception performance and the listening channel allocations are coordinated for different ones of the Backbone nodes. Step 120 has two parallel sub steps as shown, any or all of which may be used. At step 300, RSSI associated with the packet is detected at each Backbone node which receives the packet, and is passed on to the sink backbone node. At step 310, indications of wireless interference are detected such as RSSI of the interference measured at the same or other radio channels at the Backbone node, carrier sense assessments of the interference measured at the same or other radio channels at the Backbone node, and interference detected at the ULP node for example. This can also include the correlation of the interference over multiple channels, and accurate timing information of the interference allowing the correlation of the interference over multiple backbone nodes to be assessed later on.

Reception Performance

In a radio device the received signal strength indicator (RSSI) circuit provides measurement of the power present in a received radio signal. The RSSI is the relative received signal strength in a wireless environment, in arbitrary units for power level and within a certain range (range of RSSI values). The RSSI can be measured during (preamble) packet reception and/or without packet reception. The measurement relates normally to the received radio signal including various stages of filtering, thus to some in-channel power level.

Carrier sense methods in wireless networking can be based on receiver processing to verify if a (preamble of a) packet is present and/or another signal is present, and optionally if the received signal strength is above a certain threshold level.

Link quality relates to the relative signal strength, signal-to-noise ratio, signal-to-interference ratio, signal distortion (as result of channel response degradation including multi-path effects) and/or a combination of these.

Figure 9:
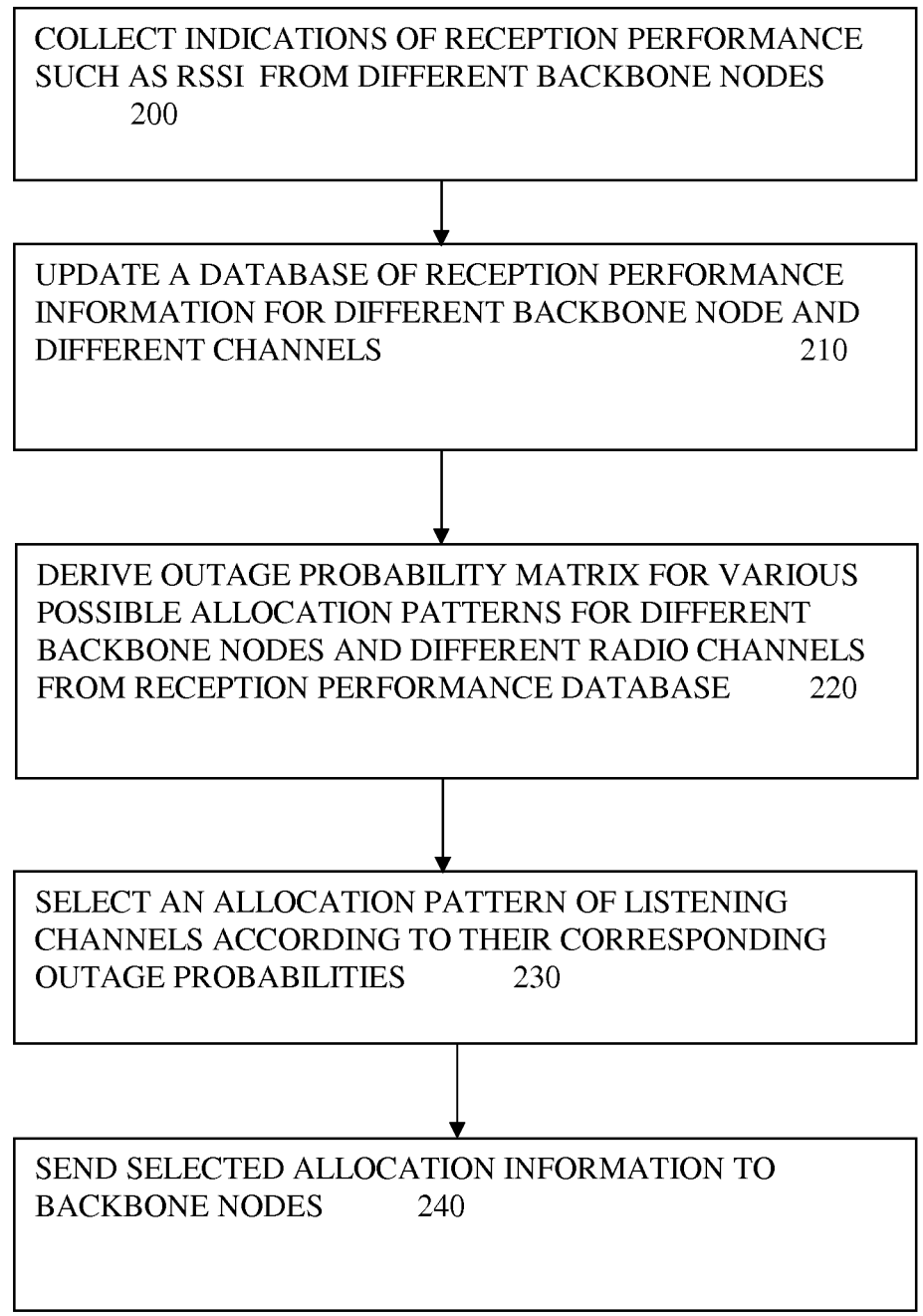
FIG. 9 shows steps of a method of allocating listening channels according to an embodiment using an outage probability matrix.

FIG. 9, Allocation Method Using Outage Probability Matrix

FIG. 9 shows steps of a method of allocating listening channels according to an embodiment using an outage probability matrix. Step 200 shows collecting indications of reception performance such as RSSI from different BBNs. This is used to update a database of reception performance information for different BBNs and different channels at step 210. Then an outage probability matrix for various possible allocation patterns for different BBNs and different radio channels can be derived from the reception performance database at step 220. An allocation pattern of listening channels can then be selected according to their corresponding outage probabilities at step 230, and the selected allocation information can be sent to backbone nodes at step 240. An example of the outage probability matrix will be described in more detail below.

Outage Probability

A packet error rate (PER) and/or bit error rate (BER) of a data receiver depends on the receive conditions as receive level of the desired signal, interference and/or noise level, signal-to-interference ratio (SIR) and/or signal-to-noise ratio (SNR). In one example a link is regarded as unreliable when the packet error rate (PER) is higher than 5%. This will occur with a certain transceiver system (modulation type, spreading, coding, low receiver noise) with a SIR lower than 5 dB. With a SIR lower (worse) than 5 dB, the PER will be higher (worse) than 5%.

In one example the link is regarded as having an outage (outage probability of 100%) when the PER is permanently worse than 5%. The outage probability corresponds to the probability the PER exceeds 5% (or the SIR drops below 5 dB).

BBN Receive Level

A BBN (Backbone node) is normally operating in the receive mode on a single channel to anticipate on a transmission by a ULPN, but at regular intervals it switches to listen for one or more other channel frequencies to measure the RSSI (receive signal strength indicator) level to characterize the (in-channel) interference level.

A BBN receives transmissions of a single ULPN at approximately the same receive level and in case the BBN switches to listen to another channel, about the same receive level can be expected. (Note there is a certain frequency selective variation, but in this example this is assumed to be negligible.) The RSSI measured with such transmissions by a single ULPN gives some variation (over time and over channel frequencies). Some variation occurs due to fading/shadowing for example by a person walking through a room and standing near the ULPN light switch, but such variation is assumed here to be negligible.

The outage probability with regard to a certain BBN and a certain ULPN on a certain channel frequency corresponds to probability of interference at the BBN, and corresponds to the probability that the interference is larger than the receive level for the ULPN minus 5 dB in this example. Such an outage probability for the certain BBN, certain ULPN and certain channel can be estimated by measurements of the RSSI level by the BBN during the reception of the ULPN transmission compared to measurements of interference level taken at moments when there is no ULPN transmission. Next, the outage probabilities for all ULPNs, all BBNs and all channels can be estimated likewise. Then, at some central processing point all outage information can be combined to determine the preferred setting of the BBN channel frequencies.

Example with 2 ULPNs

An example with 6 BBNs (m=0, 1, . . . 5), 2 ULPNs (n=0, 1), and 3 channel frequencies (k=0, 1, 2) will be described. First the steps of describing the receive levels at the 6 BBNs with regard to the 2 ULPNs are taken. The matrix below characterizes the RSSI with regard to index m,n with m referring to the BBN and n to the ULPN. When a BBN cannot receive a certain ULPN some lower RSSI reference level is used for the $rssi_{m,n}$ in question.

TABLE 1 matrix of receive performance information RSSI_BBN-ULPN

| | |
|---|---|
| $rssi_{0,0}$ | $rssi_{0,1}$ |
| $rssi_{1,0}$ | $rssi_{1,1}$ |
| $rssi_{2,0}$ | $rssi_{2,1}$ |
| $rssi_{3,0}$ | $rssi_{3,1}$ |
| $rssi_{4,0}$ | $rssi_{4,1}$ |
| $rssi_{5,0}$ | $rssi_{5,1}$ |

The interference level distribution can be measured at each BBN by measuring the RSSI at regular intervals when there is no ULPN transmission detected. Such interference RSSI measurement information at a certain BBN and a certain channel can be combined with the above mentioned RSSI_BBN-ULPN matrix to derive the outage probability with regard to m/n/k-th BBN/ULPN/channel.

The matrix below reflects the probability of a SIR level related to the m/n/k-th BBN/ULPN/channel that is lower than 5 dB. The first 3 columns (with middle index 0) refer to links from $ULPN_0$ and the last three columns (with middle index 1) refer to $ULPN_1$. (with C ULPNs this matrix will grow to C×3 columns).

TABLE 2 outage probability matrix Outage_BBN-ULPN-channel

| | | | | | |
|---|---|---|---|---|---|
| $out_{0,0,0}$ | $out_{0,0,1}$ | $out_{0,0,2}$ | $out_{0,1,0}$ | $out_{0,1,1}$ | $out_{0,1,2}$ |
| $out_{1,0,0}$ | $out_{1,0,1}$ | $out_{1,0,2}$ | $out_{1,1,0}$ | $out_{1,1,1}$ | $out_{1,1,2}$ |
| $out_{2,0,0}$ | $out_{2,0,1}$ | $out_{2,0,2}$ | $out_{2,1,0}$ | $out_{2,1,1}$ | $out_{2,1,2}$ |
| $out_{3,0,0}$ | $out_{3,0,1}$ | $out_{3,0,2}$ | $out_{3,1,0}$ | $out_{3,1,1}$ | $out_{3,1,2}$ |
| $out_{4,0,0}$ | $out_{4,0,1}$ | $out_{4,0,2}$ | $out_{4,1,0}$ | $out_{4,1,1}$ | $out_{4,1,2}$ |
| $out_{5,0,0}$ | $out_{5,0,1}$ | $out_{5,0,2}$ | $out_{5,1,0}$ | $out_{5,1,1}$ | $out_{5,1,2}$ |

Each BBN operates to listen on one channel (apart from time to time during a short interval measuring the interference RSSI), which means that within both the first 3 elements of each row (and the last 3 elements of each row) only one outage element is relevant. Such relevant outage element for the m-th row corresponds to the channel at which the n-the BBN is operating.

Consider a channel combination with the 0-, 1-, . . . 5-th BBN operating respectively at the 1-, 2-, 0-, 0-, 2-, 2-th channel. Then several matrix elements Outage_BBN-ULPN-channel have to be filled in with the value 1. Such a 1 means an outage of 100% because that channel is not used by the corresponding BBN and from the corresponding BBN and channel there is no contribution to the overall successful transfer to the sink. The filling with 1's is identical between the left and right (3 column) part since the channel in use at a certain BBN is the same for the two ULPNs.

TABLE 3 matrix Outage_BBN-ULPN-combination

| | | | | | |
|---|---|---|---|---|---|
| 1 | $out_{0,0,1}$ | 1 | 1 | $out_{0,1,1}$ | 1 |
| 1 | 1 | $out_{1,0,2}$ | 1 | 1 | $out_{1,1,2}$ |
| $out_{2,0,0}$ | 1 | 1 | $out_{2,1,0}$ | 1 | 1 |
| $out_{3,0,0}$ | 1 | 1 | $out_{3,1,0}$ | 1 | 1 |
| 1 | 1 | $out_{4,0,2}$ | 1 | 1 | $out_{4,1,2}$ |
| 1 | 1 | $out_{5,0,2}$ | 1 | 1 | $out_{5,1,2}$ |

There are $3^6$ channel combinations possible with the 6 BBNs and the aim is to select the best of these channel combinations. In this example some correlation is assumed between presence of interference at the different BBNs that operate at the same channel. For this reason it is assumed that the risk on not receiving correctly the packet from an ULPN by one of these BBNs operating at the same channel is much higher than the multiplication of the risks by the BBNs on the channel in question. Therefore in this example an approximation for the outage metric is based on only the outage of the BBN operating at a certain channel that has the best (that is minimum) outage with respect to a certain ULPN:

Outage_BBNs-0-th ULPN-0-th channel=
   $\mathrm{Min}(\mathrm{out}_{2,0,0}, \mathrm{out}_{3,0,0})$ Outage_BBNs-0-th ULPN-1-th channel=
   $\mathrm{Min}(\mathrm{out}_{0,0,1})$ Outage_BBNs-0-th ULPN-2-th channel=
   $\mathrm{Min}(\mathrm{out}_{1,0,2}, \mathrm{out}_{4,0,2}, \mathrm{out}_{5,0,2})$ In this example it is assumed that there is no correlation between the presence of interference on the different channels. (This occurs when the bandwidth of interference is small compared to spacing of the channel frequencies like with Bluetooth, microwave oven etc. This assumption does not hold in situations when the bandwidth of the interference is not small compared to the spacing of the channel frequencies, like with Wi-Fi with 11 n channel bounding)

In this example with 6 BBNs, 2 ULPNs and 3 channel frequencies it is assumed that the outage probability with regard to 0-th and 1-th ULPN can derived with using multiplication of intermediate results per channel, and calculation becomes as follows:

Outage_BBNs-0-th ULPN-all channels==
   $\mathrm{Min}(\mathrm{out}_{2,0,0}, \mathrm{out}_{3,0,0}) * \mathrm{Min}(\mathrm{out}_{0,0,1}) *$
   $\mathrm{Min}(\mathrm{out}_{1,0,2}, \mathrm{out}_{4,0,2}, \mathrm{out}_{5,0,2})$ and Outage_BBNs-1-th ULPN-all channels==
   $\mathrm{Min}(\mathrm{out}_{2,1,0}, \mathrm{out}_{3,1,0}) * \mathrm{Min}(\mathrm{out}_{0,1,1}) *$
   $\mathrm{Min}(\mathrm{out}_{1,1,2}, \mathrm{out}_{4,0,2}, \mathrm{out}_{5,1,2})$ For practical reasons the best overall system outage is taken as the situation where the worst (largest) of the outages for the 0-th and 1-th ULPN has to be optimized (minimized). This can be represented as finding the situation with the minimum of the following:

Max[$\mathrm{Min}(\mathrm{out}_{2,0,0}, \mathrm{out}_{3,0,0}) * \mathrm{Min}(\mathrm{out}_{0,0,1}) *$
   $\mathrm{Min}(\mathrm{out}_{1,0,2}, \mathrm{out}_{4,0,2}, \mathrm{out}_{5,0,2})$,
   $\mathrm{Min}(\mathrm{out}_{2,1,0}, \mathrm{out}_{3,1,0}) * \mathrm{Min}(\mathrm{out}_{0,1,1}) *$
   $\mathrm{Min}(\mathrm{out}_{1,1,2}, \mathrm{out}_{4,0,2}, \mathrm{out}_{5,1,2})$]

Thus with all of the $3^6$ channel combinations the above-mentioned

Max . . . [Min*Min*Min,Min*Min*Min]

can be calculated.

Next the best channel combination can be found with lowest Max (lowest outage).

An initial channel combination to start with, can be based on random channel assignment or fixed sequence assignment.

Adaptation of the channel settings can be made all at once or with step by step changes and excluding combinations occurring in between that provide a bad overall outage. Other intermediate approximations to calculate some outage metrics that are different from the ones followed in this example, can be followed. The above described optimization is based on a number assumptions with respect to a simplified outage model and certain interference correlation condition (related to time of occurring, between channels, between BBN positions). In practice there are always Gaussian-like variations and simplified first order approximation modelling and optimization can give a major performance improvement. More refined modelling with say 5-step histogram distribution information processing can improve this further but would require more dedicated processing.

In some cases information on the current interference level of the different channels (like energy density and carrier sense) can be measured by the ULPN and transferred to the backbone network by including this information in the packets transmitted by the ULPN, when estimating the packet error rate for future packets on the different channels.

In some examples a history of the reception performance in terms of RSSI or other interference level measurements of the different channels and the correlation between the interference levels of different channels is additionally used, when allocating the listening channels of the BBNs.

Figure 10:
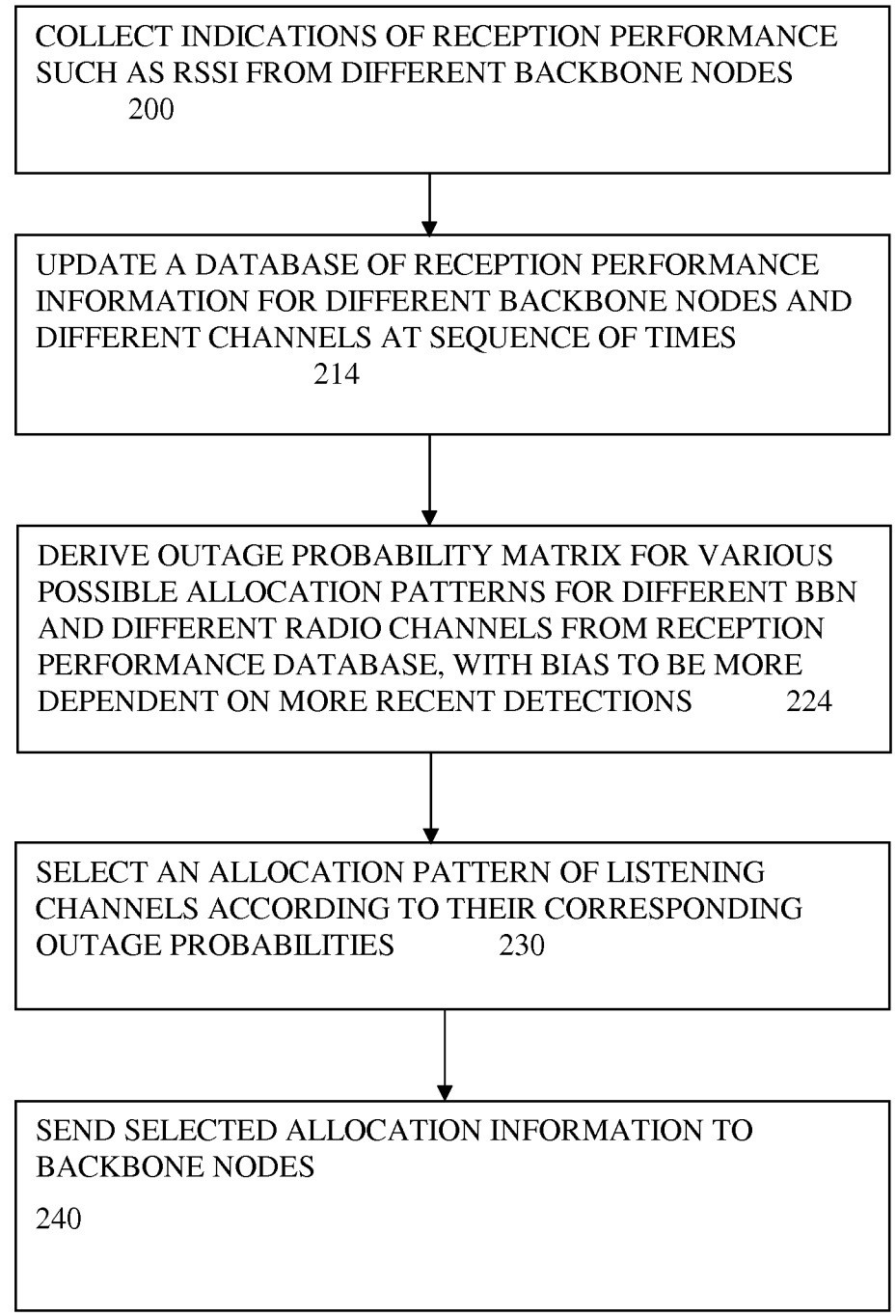
FIG. 10 shows another embodiment with allocation biased towards more recent reception performance.

FIG. 10, Allocation Method with Bias to More Recent Reception Performance

FIG. 10 shows another embodiment with allocation biased towards more recent reception performance. The steps are as shown in FIG. 9, but in place of step 210 there is a step 214 of updating a database of reception performance information for different BBNs and channels at a sequence of times. In place of step 220, there is a step 224 in which an outage probability matrix for various possible allocation patterns for different BBNs and different radio channels can be derived at step 224 from the reception performance database, with a bias to be more dependent on more recent reception performance detections. This can be implemented following some of the details set out in the example described above, adapted to introduce the bias, so that the information derived from packet $a_{i+j}$ is assigned a higher weight than the information from $a_{i+j-1}$ when estimating the packet error rates for future packets.

Figure 11:
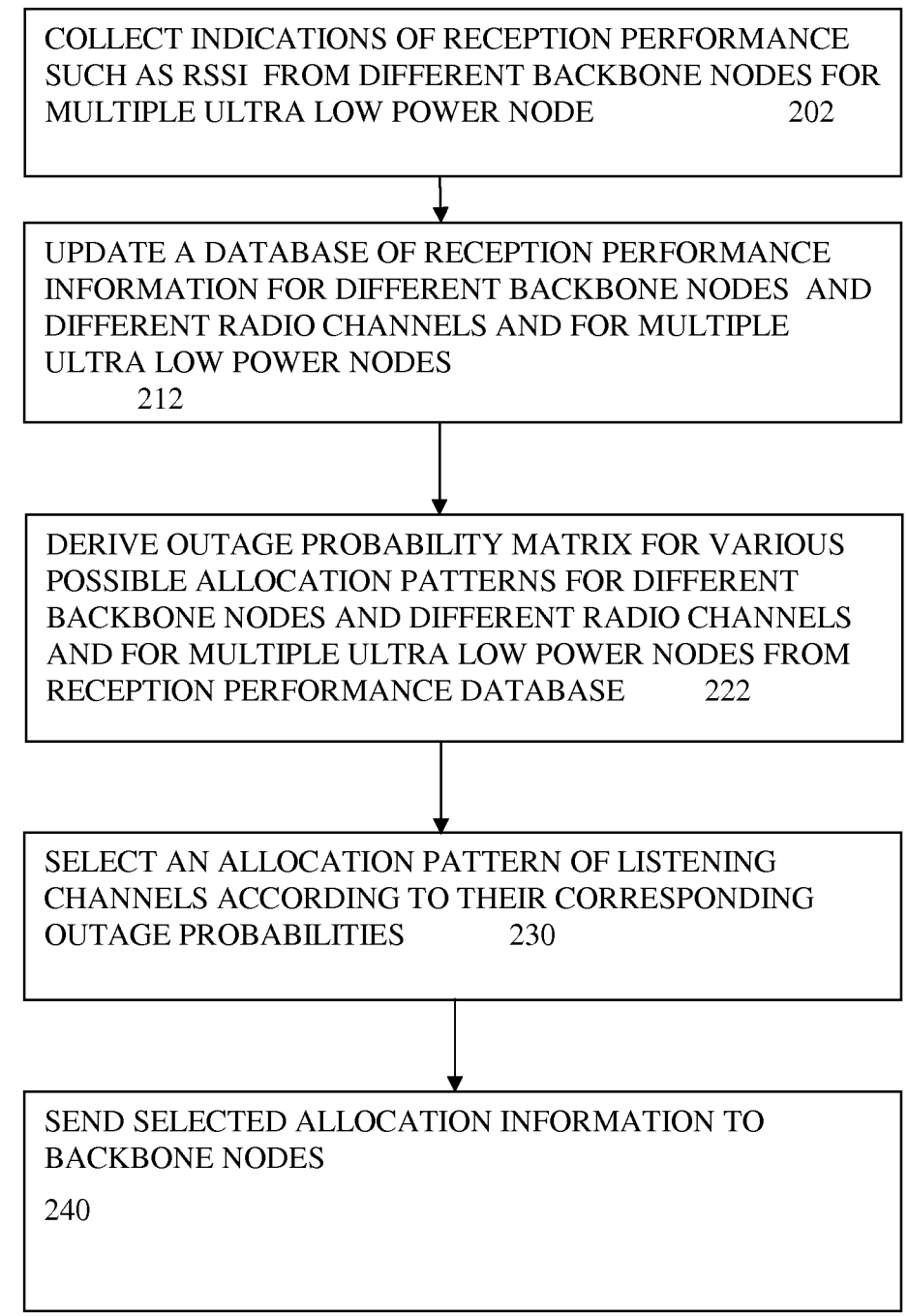
FIG. 11 shows another embodiment showing reception performance detection and allocation coordinated for multiple ULP nodes.

FIG. 11, Allocation Method for Multiple ULP Nodes

FIG. 11 shows another embodiment showing reception performance detection and allocation coordinated for multiple ULPNs The steps are as shown in FIG. 9, but in place of step 200 there is a step 202 of collecting indications of reception performance such as RSSIs from different BBNs for multiple ULPNs. In place of step 210, there is a step 212 of updating a database of reception performance information for the indications of reception performance relating to the multiple ULPNs. In place of step 220, there is a step 222 of deriving an outage probability matrix for the multiple ULPNs. Again this can be implemented following some of the details of the example described above. In other words:

ULP Node A broadcasts its packets on at least two radio channels, and ULP Node B broadcasts its packets on at least two radio channels. A packet $a_i$ broadcasted by ULP Node A, is received by a subset of the Backbone Nodes, and a packet $\beta_i$ broadcasted by ULP Node B is received by the same or a different subset of the Backbone Nodes. For each of the Backbone Nodes and for each of the radio channels ULP Node A, (or respectively ULP Node B), is capable of transmitting on, dynamically (regularly or triggered by the reception by the backbone network of a packet transmitted by one of the ULPNs), an estimate is made of the packet error rates for a future packet $a_{i+n}$, (or respectively $\beta_{i+n}$), with n>0, based on the reception performance information. This information can include whether the packet $a_i$, (or respectively packet $\beta_i$), was or was not received by the respective BBNs, and the channel, signal strength and link quality associated with the eventual reception for example.

Combining the estimated packet error rates on a network scale level, to dynamically allocate the listening channels of the BBNs, enables processing in order to maximize the probability that a future packet $a_{i+n}$ or a future packet $\beta_{i+n}$ is received by at least one of the BBNs, in case of interference on one or more of the radio channels ULP Node A is broadcasting.

FIG. 12 Allocation Method with Location Information

FIG. 12 shows another embodiment showing allocation based on locations of BBNs and/or ULPNs. The steps are as shown in FIG. 9, but in place of step 220 the step of deriving outage probability 226 is based also on correlations from information about locations of detections for example. Various examples using the location of the ULPNs and/or of the BBNs as a factor can be envisaged. For example the relative location of the ULPNs and BBNs can be used to build an interference level map. This can be used additionally as a factor when estimating the packet error rate for future packets on the different channels. The location information can be derived from RSSI, LQI or transmission delay (chirp based) measurements, or can be a priori knowledge of the system for example.

Variety of Interference Conditions Various types of interference are possible. The assumed type of interference can affect the best approach to follow with regard to the selection of BBN channel frequencies. The interference might differ in properties as follows:

Local Versus Global Interference.

In the case of global interference there will be a strong correlation between the interference level seen by the different BBNs, for a given channel and a given time. Knowledge of this correlation can be exploited to optimize the channel allocations.

Small Band Interferer Versus Wideband Interferer.

In case of a wideband interferer, there will be a strong correlation between the interference levels seen on different channels by a given BBN for a given time. Knowledge of this correlation can be exploited to optimize the channel allocations.

Continuous Versus Burst Interference.

In case of a burst interferer the interference is not always present, but comes and goes in time. Certain patterns might be recognized, such as dependency on time of day, which could be exploited to optimize the channel allocations.

The Level of Interference the Interferer Generates

A low level interferer degrades the ability of the BBNs to receive the packets from the ULPNs, while a high level interferer completely blocks the ability of the BBNs to receive the packets from the ULPNs.

The invention claimed is:

1. A method of operating a wireless interface for communicating between an ultra low power wireless node and a network of backbone nodes, the method having the steps of:
    making transmissions from the ultra low power wireless node to send a same packet on at least two radio channels,
    receiving the transmissions carrying the same packet at the backbone nodes on radio channels used by the ultra low power wireless node for transmitting,
    detecting reception performance of the wireless interface, wherein reception performance includes both received signal strength indicators (RSSIs) and timing information of interference associated with packet transmissions of the same packet received on the at least two radio channels by the backbone nodes and correlation of the timing information of the interference detected and RSSI level of the interference measured for the same packet over multiple backbone nodes,
    assigning a higher weight to an indication of the reception performance that comprises the RSSI and timing information of interference that is the timing of when the interference was detected at each backbone node at a first time than to an indication of the reception performance detected at a previous time, and
    dynamically allocating which of the radio channels are listened for at the backbone nodes according to a greater bias towards the higher weighted indication of the detected reception performance, wherein the dynamically allocating comprises making coordinated allocations for different ones of the backbone nodes.

2. The method of claim 1, the step of making the transmissions from the ultra low powered wireless node being made without dynamic radio channel selection based on radio channel selection feedback information from the backbone nodes.

3. A method of allocating listening radio channels for a wireless interface for communicating between an ultra low power wireless node and a network of backbone nodes, for use when the ultra low power wireless nodes send transmissions having a same packet on at least two radio channels, for receiving the transmission carrying the same packet at the backbone nodes on radio channels used by the ultra low power wireless node for transmitting, the method having the steps of:
    receiving an indication of reception performance of the wireless interface, wherein reception performance includes both received signal strength indicators (RSSIs) and timing information of interference associated with packet transmissions of the same packet received on the at least two radio channels by the backbone nodes and correlation of the timing information of the interference and RSSI level of the interference measured for the same packet over the at least two radio channels,
    assigning a higher weight to an indication of the reception performance that comprises the RSSI and timing information of interference that is the timing of when the interference was detected at each backbone node at a first time than to an indication of the reception performance detected at a previous time, and
    allocating dynamically which of the radio channels are listened for at the backbone nodes according to a greater bias towards the higher weighted indication of the detected reception performance, wherein the dynamically allocating comprises making coordinated allocations for different ones of the backbone nodes.

4. The method of claim 3, the indication of the reception performance of the transmissions comprising an indication of whether the packet was received by the backbone nodes and further comprising at least one of: carrier sense assessments of interference measured, correlation of interference over multiple backbone nodes, and interference detected at the ultra low power wireless node and sent to the backbone nodes.

5. The method of claim 3, wherein the step of allocating comprises passing the detections of reception performance by at least two of the backbone nodes to a common location and making the allocations based on the detections collected at that common location.

6. The method of claim 3, the step of dynamically allocating comprising the step of determining outage probabilities for each radio channel for each of the backbone nodes for different patterns of listening channel allocations according to the detections and carrying out the allocating based on the determined outage probabilities.

7. The method of claim 3, wherein the transmissions comprise transmissions from at least two ultra low power wireless nodes, and the detecting step comprises detecting reception performance of the transmissions from the at least two ultra low power wireless nodes and wherein the allocating step comprises making allocations for listening channels of the backbone nodes from the set of transmit channels used by the at least two ultra low power wireless nodes.

8. The method of claim 7, and having the step of determining outage probabilities for each of the ultra low power wireless nodes for each of the backbone nodes for each of the radio channels for each of the channel allocation patterns.

9. The method of claim 3, wherein the step of making the allocations is also dependent on locations of the ultra low power wireless node and of the backbone nodes.

10. A computer program stored on a non-transitory computer-readable medium for allocating listening radio channels for a wireless interface for communicating between an ultra low power wireless node and backbone nodes, for use when the ultra low power wireless nodes send transmissions having the same packet on at least two radio channels, for receiving at the backbone nodes, the program having instructions executed by a processor to carry out the method of claim 3.

11. An apparatus for allocating listening radio channels of a wireless interface for communicating between an ultra low power wireless node and a network of backbone nodes, for use when the ultra low power wireless nodes are arranged to send transmissions having a same packet on at least two radio channels, for receiving at the backbone nodes the transmissions carrying the same packet on radio channels used by the ultra low power wireless node for transmitting, the apparatus having an input for receiving an indication of reception performance of the wireless interface between the ultra low power wireless node and the backbone nodes, wherein reception performance includes both received signal strength indicators (RSSIs) and timing information of interference associated with packet transmissions of the same packet received on the at least two radio channels by the backbone nodes and correlation of the timing information of the interference and RSSI level of the interference measured for the same packet over the at least two radio channels, and a processor configured to:

assign a higher weight to an indication of the reception performance that comprises the RSSI and timing information of interference that is the timing of when the interference was detected at each backbone node at a first time than to an indication of the reception performance detected at a previous time, and allocate dynamically which of the radio channels are listened for at the backbone nodes according to a greater bias towards the higher weighted indication of the detections of reception performance, wherein the allocating comprises making coordinated allocations for different ones of the backbone nodes, and outputting the allocations to the backbone nodes.

12. The apparatus of claim 11, the processor also being configured to determine outage probabilities for each radio channel for each of the backbone nodes for different patterns of listening channel allocations according to the indications and to carry out the allocating based on the determined outage probabilities.

13. A network having the apparatus of claim 11, and having backbone nodes coupled to the apparatus, the backbone nodes being configured to detect the reception performance and to send the indications of the reception performance to the apparatus.

* * * * *